May 21, 1968
R. J. NOVOTNY
3,383,862
ROCKET THRUST CHAMBER
Filed Feb. 14, 1966
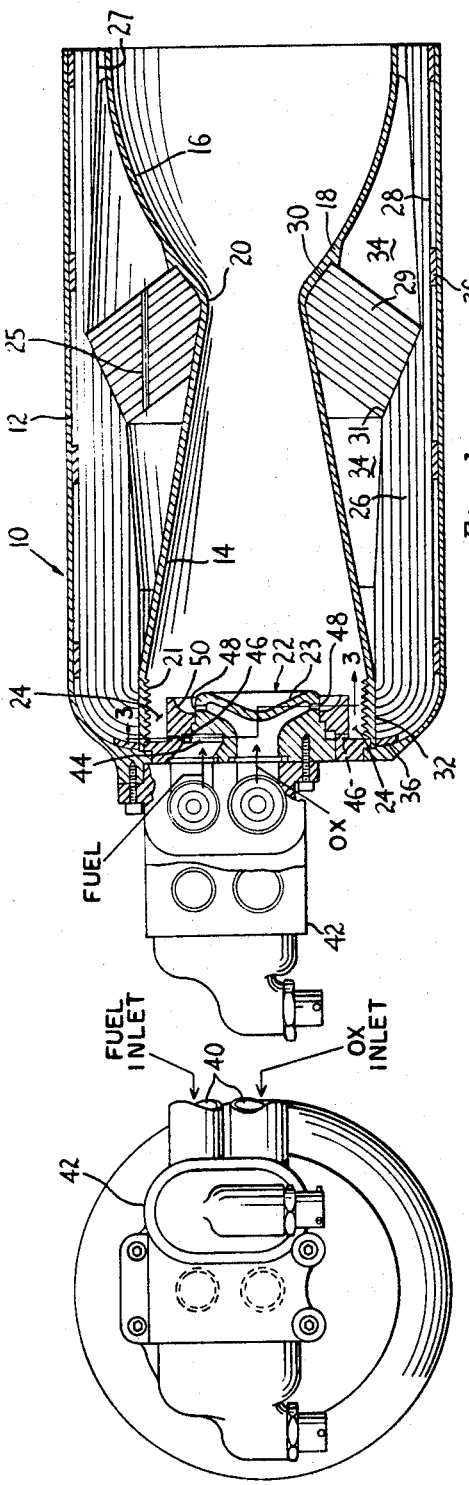
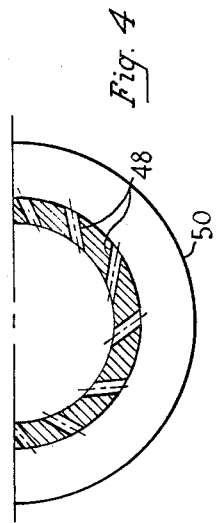
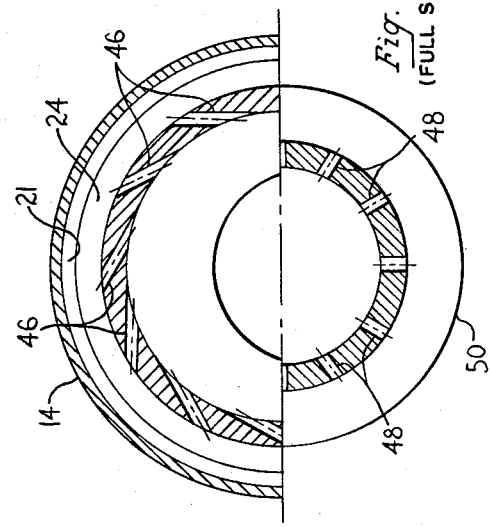
INVENTOR.
RAYMOND J. NOVOTNY
BY 
AGENT

United States Patent Office 3,383,862
Patented May 21, 1968

3,383,862
ROCKET THRUST CHAMBER
Raymond J. Novotny, Sparta, N.J., assignor to Thiokol Chemical Corporation, Bristol, Pa., a corporation of Delaware
Filed Feb. 14, 1966, Ser. No. 527,320
12 Claims. (Cl. 60—258)

ABSTRACT OF THE DISCLOSURE

This application relates primarily to an improved rocket motor thrust chamber in which a solid state heat conductor element carries heat directly from the hot nozzle throat area to the injector area and acts as an efficient thermal regenerator thus obviating the need for a liquid propellant coolant jacket with its inherent disadvantages.

---

This invention relates generally to rocket powerplants and more particularly to an improved thrust chamber. The need for a better and more versatile thrust chamber has been recognized for years. The ideal thrust chamber must be truly reliable and versatile under a vast range of operating conditions with both the presently operational and advanced high energy, high frame temperature propellants.

In a co-pending application, Ser. No. 450,366 fired Apr. 23, 1965, by the applicant and Frank R. Dunn for Rocket Thrust Chamber, such an improved structure is disclosed wherein the film cooling characteristics of a full diameter vortex injector are combined with a radiation thermal barrier and a regenerative heat sink utilizing forced convection of the propellant. This thrust chamber has proven to be singularly efficient but is limited in its application because, for example, it has the disadvantage in outboard space installations of the possibility of propellant freezing.

This disadvantage has been obviated by a further improved thrust chamber disclosed by the applicant in another co-pending application, Ser. No. 472,447 filed July 16, 1965, for Ablative Rocket Thrust Chamber, wherein the liquid regeneration of heat was replaced by an ablative heat sink. This thrust chamber while having a much lengthier life than conventional ablative chambers, has an operating life which is definitely limited.

The main object of the present invention is to provide a novel and even more improved rocket thrust chamber which approaches the ideal set forth above and which is an extension of the concepts of the above-mentioned co-pending applications in that the potential propellant freezing problem is eliminated while the heat from the nozzle throat is transferred to a novel thermal regenerator to produce a thrust chamber of unlimited duration.

An important object of the present invention is to provide an improved rocket thrust chamber having no coolant (liquid propellant) jacket, and in which the heat is conducted from the high heat flux zone at the exhaust nozzle throat directly to the liquid propellant in the immediate post-injection zone within the combustion chamber proper.

Another important object of the present invention is to provide an improved rocket thrust chamber of the vortex injection type in which means are provided for preventing mixture of the propellants until after an effective chamber wall, liquid cooling film is formed.

Other objects and advantages of the invention will become apparent during the course of the following description.

In the drawings there is shown one embodiment of the invention. In this showing:

FIGURE 1 is a central, longitudinal sectional view of the improved rocket thrust chamber comprising the present invention;

FIGURE 2 is an elevational view of the upstream end thereof;

FIGURE 3 is a transverse sectional view through the propellant injector of the invention, taken on the line 3—3 of FIGURE 1;

FIGURE 4 is a similar view of a modified form of propellant injector for use with the invention.

Referring to FIGURES 1 to 3 of the drawings, numeral 10 designates as a whole the rocket thrust chamber comprising the invention which includes an outer combustion chamber wall or jacket 12 preferably of stainless steel and having a low emissivity inner surface, and an inner combustion chamber refractory ceramic coated wall or liner 14 of tatalum/tungsten (90/10) terminating aft in a convergent-divergent exhaust nozzle 16 and having an annular shoulder 18 formed on its outer surface adjacent the nozzle throat 20. The forward end of the inner surface of the inner chamber wall 14 is provided with a nickel quad, etc. lead helix or ribs 21 and forms a vortex thermal regenerator as will be further described.

The thrust chamber 10 is closed at its left or upstream end by a circular, full diameter vortex injector assembly 22 of the "vortex type" which will be further described and which defines a propellant injection chamber 24 and coolant (usually fuel) annulus with the thrust chamber for the injection of one of the hypergolic propellants therein which may comprise a fuel such as monomethylhydrazine. The oxidizer which is injected downstream, as will be explained, may be nitrogen tetraoxide. Thus, only the fuel is injected into the chamber 24 or coolant annulus which is essential to offset the heat of the hot gas upstream of the flame front, and provide a longer life for the downstream affected surfaces.

The cooling of the thrust chamber 10 is accomplished by taking advantage of the film cooling effect of the vortex injector 22 in conjunction with a thermal shunt 26 which conducts heat to the vortex thermal regenerator 21 from the critical nozzle throat area 20 where the gas side combustion chamber wall temperatures tend to become excessive.

Although metals such as copper, silver, etc. are excellent conductors, they are unsuitable for use as the shunt 26 because they have relatively low melting points, excessive weight, and an equal thermal conductivity in all directions. The shunt is therefore formed of pyrolytic graphite which has high temperature capability (sublimes at approximately 6600° F.), a low specific gravity (2.2), and a highly anisotropic thermal conductivity characteristic which makes it a very desirable thermal shunt material. At temperatures up to 1000° F., pyrolytic graphite has a thermal conductivity approximating copper in the high conductivity or *ab* direction while in the crosswise or *c* direction, it is almost as poor a thermal conductor as a typical ablative material. (It is, of course, understood that pyrolytic graphite is inherently self laminating during its formation so that it is not necessary to refer to it as "laminated."

As seen in FIGURE 1, the thermal shunt 26 is formed into a laminated, generally cylindrical shape 28 extending from the outer surface of the vortex thermal regenerator 21 rearwardly to terminate flush with the exhaust nozzle 16 and has a conical portion 29 whose ends are scarfed as at 30, 31, and 32 so as to transmit the heat away from the nozzle throat area and forwardly to the heat sink or vortex thermal regenerator 21 along its *ab* planes. The shunt 26 and its conical portion 29 is arranged exteriorly of the combustion chamber liner 14 to define therewith two radiation gaps 34, and is structurally supported to eliminate or minimize load carrying and thermal expansion stresses, by the annular nozzle shoulder 18 and by longitudinally spaced silastic bands 36 or by being completely potted in high temperature silicone rubber.

It will be apparent that the pyrolytic graphite thermal shunt 26 is shield from the combustion gas environment by the refractory metal liner 14 and is thus protected from chemical attack due to oxidation or erosion, and a majority of it being operated at relatively low temperatures, the shunt insures high absolute values of thermal conductivity in the *ab* direction. Also, inasmuch as delaminations decrease heat transfer in the *c* direction and further enhance the effective anisotropic properties of the shunt, any delaminations which occur in the pyrolytic graphite are beneficial, not detrimental, to its operation.

Thus, the *ab* planes of the pyrolytic graphite being in contact with the combustion chamber liner 14 at the throat area 20, are oriented to allow the heat transferred thereto to be rapidly conducted away to the heat sink or vortex thermal regenerator 21 which in turn transfers the heat to the vortexing propellant (usually fuel) in the coolant annulus or injection chamber 24. The pressurized hypergolic propellants are delivered by conduits 40 to a propellant manifold housing 42 containing a pair of close coupled, on/off squib or electrically actuated valves (not shown) for the control of the fuel and oxidizer.

It is to be noted that the number of scarfed laminations bounding the upstream radiation gap 34 increases toward the upstream end and that the number bounding the downstream radiation gap 34 increases toward the aft or downstream end. This insures that all heat radiated from the liner 14 is first absorbed by these scarfed laminations and then transmitted upstream to the regenerator 21 and downstream to aft end without interfering with the transmission of heat along the *ab* planes from the nozzle throat 20 to the regenerator 21, as all of these lamina flow paths are separate.

During operation of the thrust chamber, the fuel is supplied to an annular volute passage 44 and then to a group of circumferentially spaced, tangential orifices 46 in the injector head 22 which are spaced upstream therealong from a group of circumferentially spaced radially arranged, oxidizer orifices 48. The two groups of orifices are separated by an annular splash plate 50 which has an arcuate aft or downstream face to deflect the oxidizer downstream away from the fuel being injected into the coolant annulus or injection chamber 24.

Upon leaving the tangential orifices 46, the fuel streams impinge the wall of the injection chamber or coolant annulus 24 and, being shielded by the oxidizer splash plate 50, a strong vortex film develops and spreads downstream to cool the helical regenerator surfaces 21, the injection chamber or coolant annulus 24, and combustion chamber walls. As disclosed in FIGURE 1, the impinging fuel streams first pass over and between the helical ribs of the vortex thermal regenerator 21 "scrubbing" them at injection velocity. The grooves between the ribs are V-shaped to increase the heat transfer area and facilitate the regenerative thermal action.

The oxidizer is supplied centrally of the injector 22 assembly, regeneratively cools the oxide-insulated concave head spud 23 and then flows through the radial orifices 48 in streams which impinge and film cool the oxidizer splash plate 50. The oxidizer is thus deflected and fans outwardly to form a conical sheet directed downstream away from the fuel injection orifices 46, and increases the liquid phase mixing area of the oxidizer with the fuel. This mixing occurs downstream of the helical ribs of the vortex thermal regenerator 21 in order to insure undisturbed coolant (fuel) flow in the grooves between the ribs.

While the vortex injector assembly of FIGURES 1 to 3 has proven remarkably efficient in operation, the modified form thereof disclosed in FIGURE 4 has additional advantages in operation. As shown, each of the oxidizer orifices 48' is canted or arranged tangentially instead of radially, so as to produce a downstream or rearwardly deflected, tangentially swirling fan of injected oxidizer which contacts the fuel vortex film for mixing downstream of the thermal vortex regenerator 21 with a minimum of interference. Thus, instead of the "billboards" or standing waves of liquid propellant normally existing between the liner 14 contact area of each set of injection orifices, which waves possess only a small amount of vortex motion and cause erosive streaking of the chamber wall and nozzle throat to place an added thermal and durability burden on the combustion cavity, the modified form disclosed in FIGURE 4 greatly improves combustion efficiency so that the "billboards" are replaced by a swirling uniform fan, which blends and mixes with, rather than disturbing, the fuel coolant film—the optimum condition as described.

In addition to the efficiencies described, engine reliability is promoted in both forms of the injector as the possibility of oxidizer splashing back into the fuel orifices and causing combustion to occur in the fuel manifold is eliminated. It will be apparent that performance cannot only be "dialed" by radial orientation of propellant orifices but also "tailored" by simply changing the oxidizer splash plate ramp angle or arcuateness. This angle controls the axial impingement location of the oxidizer on the combustion chamber wall downstream from the vortex thermal regenerator 21. Injector durability is increased as the liquid phase mixing and combustion takes place uniformly downstream and away from the oxidizer spud, and chamber durability is also increased as the liquid vortex cooling film has a minimum of interruption as the splash plate prevents direct impingement by the radial or tangential oxidizer streams.

The sections of the combustion chamber liner 14 not in direct contact with the pyrolytic graphite are cooled by radiation to the separate and additional scarfed *ab* planes described which conduct the heat to the regenerator 21 and to the aft end of the thrust chamber for radiation into space (the latter could be scarfed so as to conduct heat forwardly to the regenerator 21), and by the film cooling effect of the vortex injector along the combustion chamber liner inner surface. The latter is evidenced by experimental test data. To avoid any possible undesirable pressure in space applications due to assembly of the thrust chamber 10 under atmospheric pressure, such is vented by a few small circumferentially arranged passages 25, 27 formed in the pyrolitic graphite at the throat and aft end of the exhaust nozzle.

It will be appreciated from the foregoing that the elimination of the liquid coolant jacket effects the following advantages: boiling and decomposition of the coolant (propellant) during steady state and soak are eliminated as are jacket pressure drops which limit the throttling range and raise supply pressures; design simplicity is obtained with inherent cost and reliability refinements; and heat flux to the chamber walls is regenerated to the propellant downstream of the valving and injector orifices thus relieving the valve thermal loading and two phase injection flow problems.

It will thus be apparent that the novel thrust chamber and injection means comprising the present invention will: enable higher payloads using high energy propellants; provided long firing durations and total thrust chamber life using solid state non-sacrificial regeneration; afford flexibility of application as it can be pulsed, throttled and operated off-design; enable high chamber pressure operation so as to use small cross-section missiles having significant range gains (with packaged liquid propellant engines); and be economic as its versatility and design simplicity enables fabrication savings.

It is to be understood that the form of the invention herewith shown and described is to be taken as a preferred example of the same and that various changes in the shape, size and arrangement of parts may be resorted to without departure from the spirit of the invention or the scope of the subjoined claims.

I claim:
1. A rocket thrust chamber comprsing, in combination, an outer casing; an inner casing spaced therefrom and concentric therewith and defining an injection chamber and a combustion chamber terminating in a convergent-divergent exhaust nozzle; a thermal conductor spaced from said inner casing and having ends in heat conducting engagement with the throat of said nozzle and with an area of said inner casing intermediate said injection and combustion chambers; the inner face of said casing area having helical ribs to increase to heat exchange area; and means for injecting propellant tangentially into said injection chamber to form a wall cooling liquid film passing downstream over said area to absorb heat therefrom.

2. The combination recited in claim 1 wherein said thermal conductor contacts the aft end of the exhaust nozzle to absorb heat therefrom and transfer it to the atmosphere.

3. The combination recited in claim 1 wherein said thermal conductor is formed of pyrolytic graphite.

4. The combination with a thrust chamber including a combustion chamber terminating in a convergent-divergent exhaust nozzle and having propellant admitted to the combustion chamber in a film along its walls to cool a portion thereof before combustion of said film in said combustion chamber; of a thermal shunt spaced from and extending exteriorly of said combustion chamber and contacting the throat of said nozzle and said film cooled wall portion to conduct heat away from said throat, the inner surface of said wall portion having a plurality of ribs forming an enlarged heat exchange area.

5. The combination recited in claim 4 wherein said shunt is formed of pyrolytic graphite.

6. In combination, a rocket thrust chamber including a shell defining a combustion chamber terminating in an exhaust nozzle, an outer concentric shell spaced therefrom, means spaced from said defining shell and extending between said shells and contacting the throat of said exhaust nozzle and the forward part of said combustion chamber to conduct the heat from said throat to said part to cool the former, and means for passing propellants over said part to regeneratively cool it, the inner face of said part having a plurality of ribs forming an enlarged heat exchange area.

7. The combination recited in claim 6 wherein said extending means absorbs heat radiated from said defining shell and conducts it to said part.

8. The combination recited in claim 6 wherein said extending means is formed of pyrolytic graphite.

9. A rocket thrust chamber comprising, in combination, an outer casing; an inner casing spaced therefrom and concentric therewith and defining an injection chamber and a combustion chamber terminating in a convergent-divergent exhaust nozzle; a thermal conductor spaced from said inner casing and having ends in heat conducting engagement with the throat of said nozzle and with an area of said inner casing intermediate said injection and combustion chambers; the inner face of said casing area having helical ribs to increase the heat exchange area; a circular injector head projecting into the injection chamber; axially spaced circumferentially arranged groups of propellant orifices formed in said injector head for injecting separate hypergolic propellants into said injector chamber and into said combustion chamber for combustion in the latter, and an arcuate splash plate formed on said injector head between said groups to prevent premature mixing of said propellants; one of said propellants being tangentially injected into said injection chamber to form a wall cooling liquid film passing downstream over said area to absorb heat therefrom before ignition of said film in said combustion chamber upon contact with the other hypergolic propellant.

10. The combination recited in claim 9 wherein the arcuateness of said splash plate is such as to deflect said other hypergolic propellant into outwardly fanning, downstream directed contact with said one propellant downstream of said ribs.

11. The combination recited in claim 10 wherein said other propellant is injected against said splash plate by radially positioned injection orifices.

12. The combination recited in claim 10 wherein said other propellant is injected against said splash plate by tangentially positioned injection orifices so as to afford a minimum of interference with the wall cooling film of said one propellant.

References Cited

UNITED STATES PATENTS

| | | | |
|---|---|---|---|
| 2,476,185 | 7/1949 | Goddard | 60—260 |
| 3,220,180 | 11/1965 | Heckert | 60—267 |
| 3,309,026 | 3/1967 | Loprete | 60—260 |

MARTIN P. SCHWADRON, *Primary Examiner.*

MARK NEWMAN, *Examiner.*

D. HART, *Assistant Examiner.*